No. 631,359. Patented Aug. 22, 1899.
T. P. COOMBS.
LEATHER WHITENING MACHINE.
(Application filed May 13, 1899.)

(No Model.) 2 Sheets—Sheet 1.

WITNESSES.
Matthew M. Blunt.
J. Murphy.

INVENTOR.
Thomas P. Coombs
by
Jas. H. Churchill
ATT'Y.

No. 631,359. Patented Aug. 22, 1899.
T. P. COOMBS.
LEATHER WHITENING MACHINE.
(Application filed May 13, 1899.)

(No Model.) 2 Sheets—Sheet 2.

WITNESSES.
Matthew M. Blunt.
J. Murphy.

INVENTOR
Thomas P. Coombs
by
Jas. H. Churchill
ATT'Y.

United States Patent Office.

THOMAS P. COOMBS, OF PEABODY, MASSACHUSETTS, ASSIGNOR TO THE VAUGHN MACHINE COMPANY, OF PORTLAND, MAINE.

LEATHER-WHITENING MACHINE.

SPECIFICATION forming part of Letters Patent No. 631,359, dated August 22, 1899.

Application filed May 13, 1899. Serial No. 716,673. (No model.)

*To all whom it may concern:*

Be it known that I, THOMAS P. COOMBS, a citizen of the United States, residing in Peabody, in the county of Essex and State of Massachusetts, have invented an Improvement in Whitening-Machines, of which the following description, in connection with the accompanying drawings, is a specification, like letters and numerals on the drawings representing like parts.

This invention relates to a machine for whitening leather, and has for its object to provide an efficient machine for the purpose specified. In accordance with this invention the cutting cylinder or roll is carried by a pendulum and coöperates with a bed elastically supported, as will be described, and which is under the control of the foot of the operator at all times to properly position the bed with relation to the cutting-cylinder to thereby regulate in an accurate manner the depth of the cut in the leather made by the said cylinder. These and other features of this invention will be pointed out in the claims at the end of this specification.

Figure 1:
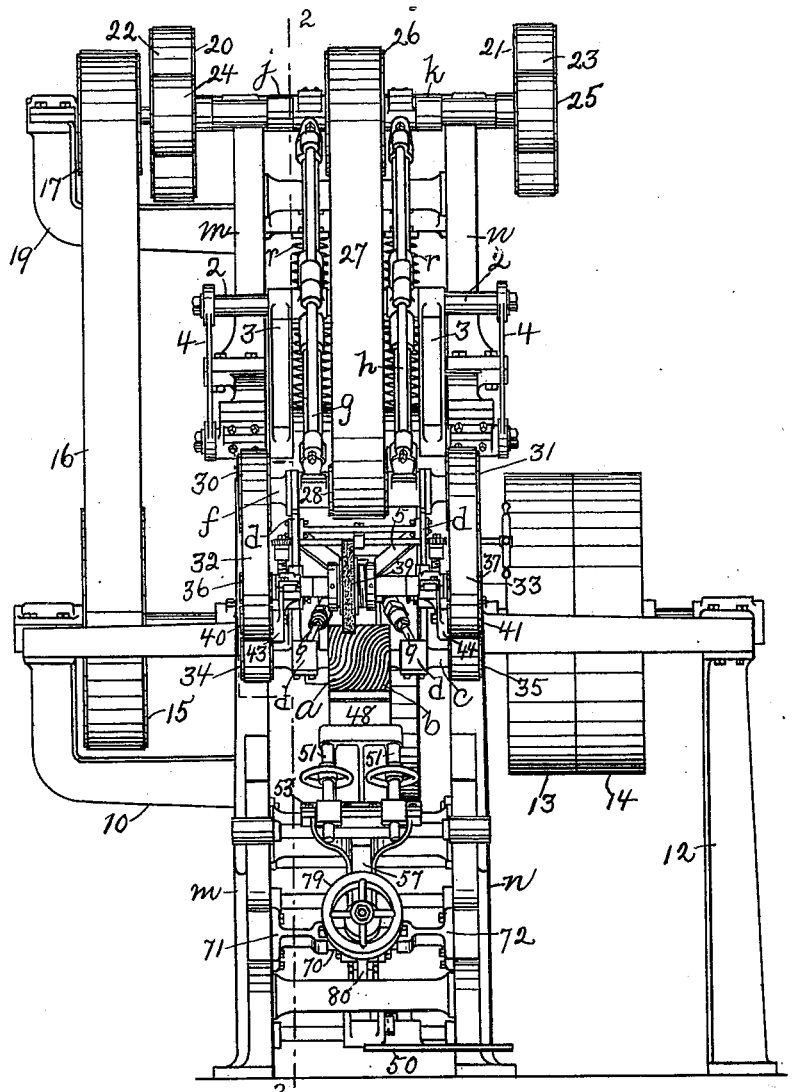
Figure 4:
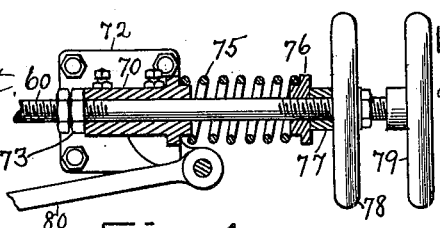
Figure 2:
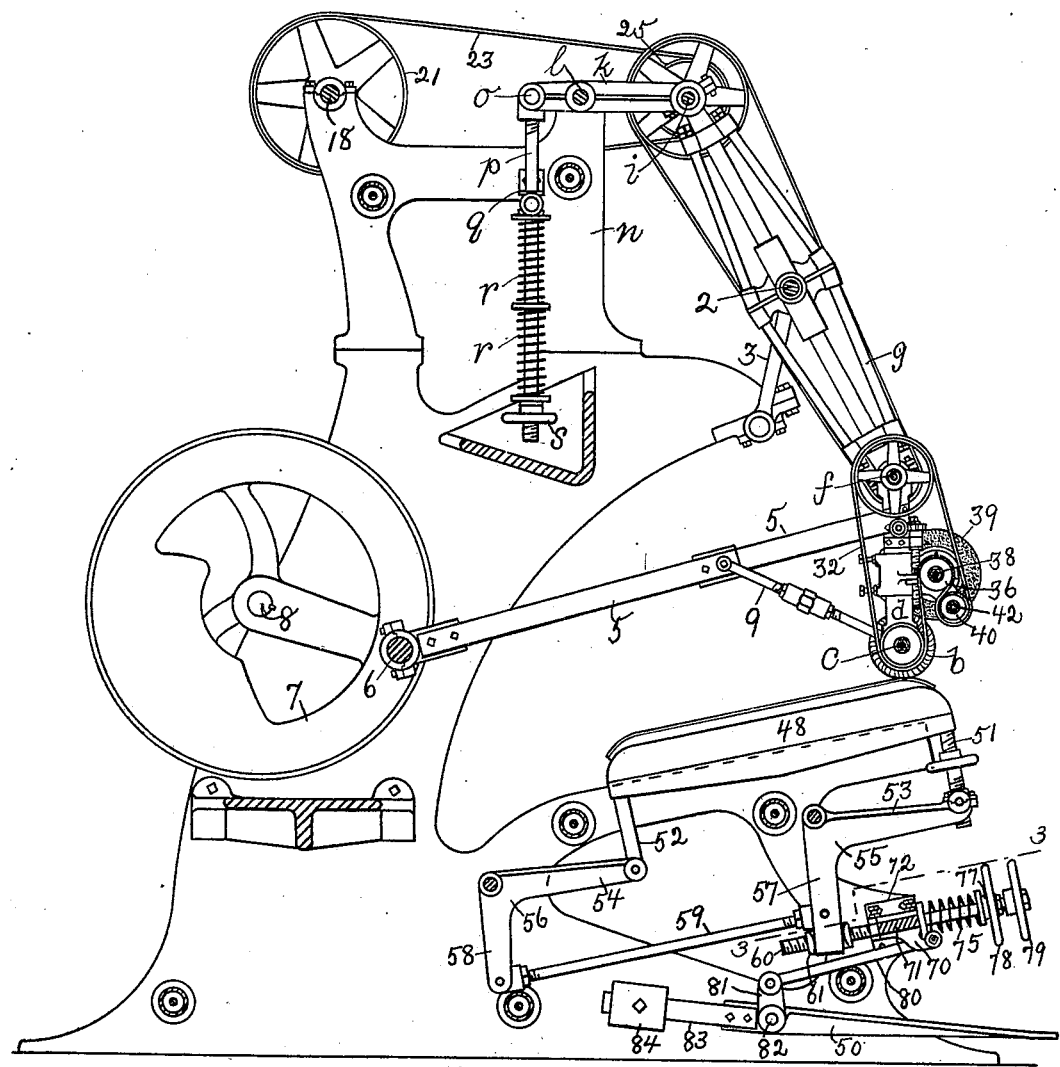
Figure 3:
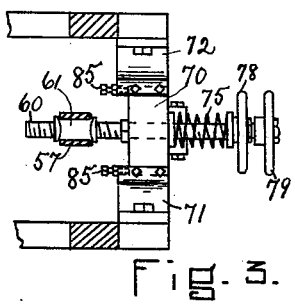

Figure 1 is a front elevation of a whitening-machine embodying this invention; Fig. 2, a section on the line 2 2, Fig. 1, looking toward the right; Fig. 3, a sectional detail to be referred to, the section being taken on the line 3 3, Fig. 2; and Fig. 4, an enlarged sectional detail to be referred to.

The whitening cylinder or roll $a$, provided on its periphery with suitable operating or cutting blades $b$, is fast on a shaft $c$, journaled in a hanger-frame $d$, pivotally mounted on a shaft $f$, having bearings in the lower end of two pendulums $g$ $h$, pivotally mounted at their upper ends on a shaft $i$, having bearings in horizontal levers $j$ $k$, pivoted on a shaft or rod $l$, supported in the upright side pieces $m$ $n$ of the main framework of the machine. The levers $j$ $k$ are connected at their rear end by a tie rod or bar $o$, from which depends a rod $p$, extended through a cross-bar $q$ and encircled by a spiral spring $r$, the tension of which is regulated by a nut $s$, the said spring acting as a counterweight for the pendulum.

The pendulums $g$ $h$ are connected at their center by a rod 2, which is joined by two sets of links 3 4 to the side pieces $m$ $n$ of the main frame, and the hanger-frame carrying the cylinder-shaft $c$ is joined by a connecting-rod 5 to a pin 6 on a fly-wheel 7, fast on the main shaft 8 of the machine.

The hanger-frame $d$ has its lower end joined by adjustable links 9 to the connecting-rod 5. The main shaft 8 is supported by the main frame and also by the bracket 10 and standard 12 (see Fig. 1) and, as shown, is provided on one side of the main frame with fast and loose pulleys 13 14 and on the opposite side with a pulley 15, connected by a belt 16 with a pulley 17 on a shaft 18, supported by the main frame and by a bracket 19, attached to one side thereof.

The shaft 18, on opposite sides of the framework, is provided with pulleys 20 21, connected by belts 22 23 with smaller pulleys 24 25 on the shaft $i$, and the latter shaft has fast on it, between the side pieces of the framework, a pulley 26, connected by a belt 27 with a pulley 28 on the shaft $f$. The shaft $f$, on opposite sides of the hanger-frame, has fast on it pulleys 30 31, which are connected by belts 32 33 to pulleys 34 35 on the cylinder-shaft $c$ at opposite sides of the hanger-frame, the belts 32 33 also passing about the pulleys 36 37 on the ends of a shaft 38, upon which is mounted a grinding-wheel 39, coöperating with the blades of the cutting-cylinder, the belts 32 33 also passing about idler-pulleys 40 41 on studs or pins 42, carried by arms 43 44, attached to the hanger-frame, the said arms supporting the shafts 38 of the grinding-wheel.

From the above description it will be noticed that the belt 27 and the pulleys 26 28 are in the same vertical plane with the cutting-cylinder and that the shaft $f$ is belted at its opposite ends to the opposite ends of the cylinder-shaft $c$, thereby obtaining what may be termed a "direct" driving of the cutting-cylinder carried by a swinging pendulum, which results in a steadier rotation of the cutting-cylinder with a minimum vibration or chattering of the cylinder, and consequently insures more efficient cutting of the leather, which is one of the features of this invention.

The bed 48 is made slightly convexed or approximately convexed and is vertically movable toward and away from the path of movement of the cutting-cylinder. The bed 48, in accordance with this invention, is supported upon levers pivoted to move in a vertical plane and connected to a foot-treadle 50, as will be described, so as to be under the control of the operator and yet leave the bed elastically supported.

The bed 48, as shown in Fig. 2, is connected at its opposite ends to links or rods 51 52, pivotally connected at their lower ends to arms 53 54 of bell-crank levers 55 56, having their other arms 57 58 connected together by a rod 59. The arm 57 of the bell-crank lever 55 is connected to a rod 60, screw-threaded at its rear end and engaged by a threaded sleeve or nut 61, which is straddled by the forked lower end of the arm 57. (See Fig. 3.) The rod 60 is extended loosely through a cross-head 70, (see Figs. 2, 3, and 4,) which is adapted to slide in suitable guideways in arms or pieces 71 72, attached to the inner side of the side pieces of the main frame.

The sliding cross-head 70 is engaged at its rear side by a nut 73, adjustable on the rod 60, (see Fig. 4,) and at its front side the said cross-head has bearing against it one end of a spring 75, which encircles the rod 60 and bears against a sleeve 76, which may be moved on said rod to adjust the tension of the spring 75 by a nut 77, provided with a hand-wheel 78, the said rod having fast on it a second hand-wheel 79, by which the rod 60 may be turned to move the nut 61, and thereby adjust the bed 48. The sliding cross-head 70 is connected by a link 80 to an arm 81 of the foot-treadle 50, which is pivoted at 82 and has attached to it an arm 83, carrying a counterweight 84 adjustable thereon. The guide-pieces 71 72 are provided, as shown, with adjustable back-stops or screws 85, (see Fig. 3,) which limit the backward movement of the sliding cross-head.

From the above description it will be seen that the bed supporting the leather is at all times under control of the foot of the operator and that by depressing the foot-treadle the sliding cross-head is moved forward, which carries with it the rod 60, connected to the bell-crank 55, the spring 75 forming a yielding connection between the cross-head and the rod 60, and therefore the bed is elastically supported and at the same time positively under the control of the treadle. When the pressure upon the foot-treadle is removed or lessened, the bed responds by reason of the counterweight 84, which keeps the cross-head in connection with the nut 73, thereby moving the rod 60 backward and lowering the bed according to the extent or amount the pressure is withdrawn from the foot-treadle. In this manner the bed is rendered sensitive to the foot of the operator and also responds to the pressure of the cutting-cylinder, which is essential in a successful whitening-machine, and in practice the bed is constantly in motion while the machine is in operation, as the skin varies in thickness and it is desirable to remove as little of the skin as possible consistent with obtaining the desired whitening effect.

By supporting the bed on pivoted levers, which are connected to a sliding cross-head by a yielding connection and connecting the said cross-head to a foot-treadle, a sensitive machine is obtained with which superior whitening of the leather may be effected.

I claim—

1. In a machine of the class described, the combination of the following instrumentalities, viz: a bed, levers upon which said bed is supported, a foot-treadle connected to said levers to positively move said levers and bed in opposite directions on the movement of said foot-treadle in opposite directions, and a yielding medium to impart elasticity to said bed, substantially as described.

2. In a machine of the class described, the combination of the following instrumentalities, viz: a bed to support the work, levers to support said bed, a foot-treadle, a sliding cross-head to which said treadle is connected, and a yielding connection between said cross-head and said bed-supporting levers, substantially as described.

3. In a machine of the class described, the combination of the following instrumentalities, viz: a vertically-movable bed, supporting-levers for said bed pivoted to move in a vertical plane, a sliding cross-head, a rod connected to the bed-supporting levers and extended loosely through said cross-head, means on said rod to engage said cross-head, a treadle connected to said cross-head, and a yielding medium acting on said cross-head in opposition to said treadle, substantially as described.

4. In a machine of the class described, the combination of the following instrumentalities, viz: a bed to support the work, an operating cylinder or roll coöperating therewith, a pendulum, a hanger-frame carrying said cylinder or roll, a shaft carried by said pendulum, and upon which said hanger-frame is mounted, a rotatable shaft upon which said pendulum is mounted to swing, pulleys on said shafts in line with the said cylinder or roll, and pulleys at opposite ends of the shaft carried by the lower end of the pendulum connected to pulleys on the shaft of the said cylinder or roll, substantially as and for the purpose specified.

In testimony whereof I have signed my name to this specification in the presence of two subscribing witnesses.

THOMAS P. COOMBS.

Witnesses:
JAS. H. CHURCHILL,
J. MURPHY.